(12) United States Patent
Pickford

(10) Patent No.: US 8,728,554 B2
(45) Date of Patent: *May 20, 2014

(54) STABILISATION OF MICROWAVE HEATED FOOD SUBSTRATES

(75) Inventor: Keith Graham Pickford, Manchester (GB)

(73) Assignee: Crisp Sensation Holding S.A., Geneva (CH)

(*) Notice: Subject to any disclaimer, the term of this patent is extended or adjusted under 35 U.S.C. 154(b) by 748 days.

This patent is subject to a terminal disclaimer.

(21) Appl. No.: 12/764,407

(22) Filed: Apr. 21, 2010

(65) Prior Publication Data

US 2011/0177210 A1    Jul. 21, 2011

(30) Foreign Application Priority Data

Jan. 15, 2010  (GB) .................................. 1000647.6
Apr. 13, 2010  (GB) .................................. 1006108.3

(51) Int. Cl.
A23B 4/10    (2006.01)
A23B 7/16    (2006.01)
A23L 1/05    (2006.01)

(52) U.S. Cl.
USPC .............. 426/291; 426/92; 426/281; 426/654

(58) Field of Classification Search
USPC ......... 426/576, 578, 243, 582, 246, 654, 281, 426/92, 291
See application file for complete search history.

(56) References Cited

U.S. PATENT DOCUMENTS

| | | |
|---|---|---|
| 3,067,921 A | 12/1962 | Reifers |
| 3,052,545 A | 9/1963 | Ducharme et al. |
| 3,208,851 A | 9/1965 | Antinori et al. |
| 3,251,531 A | 5/1966 | Hook et al. |
| 3,399,062 A | 8/1968 | Willard, Jr. et al. |
| 3,486,904 A | 12/1969 | Ziegler |
| 3,586,512 A | 6/1971 | Mancuso et al. |
| 3,597,227 A | 8/1971 | Murray et al. |
| 3,619,208 A | 11/1971 | Bahoshy et al. |
| 3,656,969 A | 4/1972 | Horn |
| RE27,531 E | 12/1972 | Murray et al. |
| 3,751,268 A | 8/1973 | van Patten et al. |
| 3,857,976 A | 12/1974 | Szymanski et al. |
| 3,899,602 A | 8/1975 | Rutenberg et al. |
| 3,904,429 A | 9/1975 | Eastman et al. |
| 3,904,601 A | 9/1975 | Tessler et al. |
| 3,915,532 A | 10/1975 | Ashton |
| 3,956,515 A | 5/1976 | Moore et al. |
| 3,969,340 A | 7/1976 | Tessler et al. |
| 3,970,767 A | 7/1976 | Tessler et al. |
| 4,068,009 A | 1/1978 | Rispoli et al. |
| 4,192,900 A | 3/1980 | Cheng |
| 4,208,442 A | 6/1980 | Evans et al. |
| 4,218,485 A | 8/1980 | Lee et al. |
| 4,308,286 A | 12/1981 | Anstett et al. |
| 4,342,788 A | 8/1982 | Chatfelter |
| 4,364,961 A | 12/1982 | Darley et al. |
| 4,393,088 A | 7/1983 | Matsusaka |
| 4,415,599 A | 11/1983 | Bos |
| 4,423,078 A | 12/1983 | Darley et al. |
| 4,427,706 A | 1/1984 | El-Hag |
| 4,440,793 A | 4/1984 | Seki |
| 4,568,550 A | 2/1986 | Fulger et al. |
| 4,568,555 A | 2/1986 | Spanier |
| 4,588,600 A | 5/1986 | Suderman |
| 4,597,974 A | 7/1986 | Fonteneau et al. |
| 4,609,557 A | 9/1986 | Mao et al. |
| 4,609,558 A | 9/1986 | Giacone et al. |
| 4,623,552 A | 11/1986 | Rapp |
| 4,767,637 A | 8/1988 | Ek |
| 4,778,684 A | 10/1988 | D'Amico et al. |
| 4,864,089 A | 9/1989 | Tighe et al. |
| 4,877,628 A | 10/1989 | Stypula |
| 4,908,487 A | 3/1990 | Sarnoff et al. |
| 4,913,918 A | 4/1990 | Stypula |
| 4,915,970 A | 4/1990 | Coffey |
| 4,943,438 A | 7/1990 | Rosenthal |
| 4,948,608 A | 8/1990 | Stypula et al. |
| 4,978,541 A | 12/1990 | Stypula et al. |
| 5,049,711 A | 9/1991 | August |

(Continued)

FOREIGN PATENT DOCUMENTS

| | | |
|---|---|---|
| CA | 980164 | 12/1975 |
| DE | 2220528 | 12/1972 |

(Continued)

OTHER PUBLICATIONS

Albert, A. et al., "Adhesion in fried battered nuggets: Performance of different hydrocolloids as predusts using three cooking procedures", Food Hydrocolloids 23 (2009) 1443-1448.
WO application No. PCT/GB92/01559, International Search Report mailed Dec. 30, 1992.
WO application No. PCT/GB95/00958, International Search Report mailed Aug. 22, 1995.
WO patent application No. PCT/GB2011/050060, International Search Report and Written Opinion mailed May 23, 2011.
WO patent application No. PCT/GB2011/050057, International Search Report mailed May 23, 2011.
WO patent application No. PCT/GB2011/050055, International Search Report and Written Opinion mailed May 20, 2011.
EP patent application No. 11152421.1, Extended Search Report mailed Jul. 5, 2011.
EP patent application No. 11152415.3, Extended Search Report mailed Jul. 5, 2011.

(Continued)

*Primary Examiner* — Humera Sheikh
*Assistant Examiner* — Saeeda Latham
(74) *Attorney, Agent, or Firm* — Weaver Austin Villeneuve & Sampson LLP

(57) ABSTRACT

A method of manufacture and a food product with a substrate impregnated with a stabilizer composition, the impregnated substrate coated with an aqueous or gel coating. The impregnation of the core with the stabilizer contributes to the moisture content of the core during subsequent cooking or reheating. The coating exhibits good adhesion to the impregnated substrate, and can facilitate adhesion of subsequently applied crumb or other fine particles and serve as an additional barrier to loss of moisture from the substrate during the subsequent cooking or reheating.

18 Claims, No Drawings

(56) References Cited

U.S. PATENT DOCUMENTS

| | | | |
|---|---|---|---|
| 5,057,329 | A | 10/1991 | Stypula et al. |
| 5,088,179 | A | 2/1992 | Gibbon |
| 5,093,176 | A | 3/1992 | Pribonic et al. |
| 5,175,010 | A | 12/1992 | Roig et al. |
| 5,202,138 | A | 4/1993 | Stypula et al. |
| H1229 | H | 9/1993 | McGinley et al. |
| 5,266,340 | A | 11/1993 | Samson et al. |
| 5,281,432 | A | 1/1994 | Zallie et al. |
| 5,308,636 | A | 5/1994 | Tye et al. |
| 5,310,977 | A | 5/1994 | Stenkamp et al. |
| 5,310,980 | A | 5/1994 | Beckett et al. |
| 5,321,900 | A | 6/1994 | Meyer |
| 5,350,585 | A | 9/1994 | Sunderland |
| 5,423,477 | A | 6/1995 | Valdman et al. |
| 5,431,944 | A | 7/1995 | Melvej |
| 5,433,966 | A | 7/1995 | Wolt et al. |
| 5,492,707 | A | 2/1996 | Chalupa et al. |
| 5,523,102 | A | 6/1996 | Morasch |
| 5,565,132 | A | 10/1996 | Sayler |
| 5,601,861 | A | 2/1997 | Gerrish et al. |
| 5,736,178 | A | 4/1998 | Cook et al. |
| 6,097,017 | A | 8/2000 | Pickford |
| 6,214,403 | B1 | 4/2001 | Broberg et al. |
| 6,261,625 | B1 | 7/2001 | Pickford |
| 6,287,621 | B1 | 9/2001 | Lacourse et al. |
| 6,288,179 | B1 * | 9/2001 | Baur et al. .............. 526/89 |
| 6,326,599 | B1 | 12/2001 | Pickford |
| 6,399,130 | B2 | 6/2002 | Parker |
| 6,413,562 | B2 | 7/2002 | Conforti et al. |
| 6,458,404 | B1 | 10/2002 | Adachi |
| 6,503,546 | B1 | 1/2003 | Ferrari-Philippe et al. |
| 6,613,370 | B1 | 9/2003 | Pickford |
| 6,620,447 | B1 | 9/2003 | Paukkunen et al. |
| 7,147,885 | B2 | 12/2006 | Asano et al. |
| 2001/0014363 | A1 | 8/2001 | Parker |
| 2001/0024672 | A1 | 9/2001 | Kondou et al. |
| 2001/0055641 | A1 | 12/2001 | Conforti et al. |
| 2002/0039615 | A1 | 4/2002 | Adachi |
| 2002/0119226 | A1 | 8/2002 | Conforti et al. |
| 2002/0192332 | A1 | 12/2002 | Pickford |
| 2003/0198711 | A1 | 10/2003 | Pickford |
| 2004/0213883 | A1 | 10/2004 | Sadek et al. |
| 2005/0169099 | A1 | 8/2005 | Sprinkle |
| 2006/0053650 | A1 | 3/2006 | Manack et al. |
| 2006/0286240 | A1 | 12/2006 | Roosjen |
| 2011/0091612 | A1 | 4/2011 | Pickford |
| 2011/0177200 | A1 | 7/2011 | Pickford |
| 2011/0177211 | A1 | 7/2011 | Pickford |
| 2012/0196004 | A1 | 8/2012 | Pickford |
| 2012/0196005 | A1 | 8/2012 | Pickford |
| 2012/0288592 | A1 | 11/2012 | Pickford |
| 2013/0156925 | A1 | 6/2013 | Pickford |

FOREIGN PATENT DOCUMENTS

| | | | |
|---|---|---|---|
| DE | 2338180 | | 2/1975 |
| EP | 17338 | | 10/1980 |
| EP | 109226 | | 5/1984 |
| EP | 155760 | | 9/1985 |
| EP | 327332 | | 8/1989 |
| EP | 344726 | | 12/1989 |
| EP | 392119 | | 10/1990 |
| EP | 510320 | | 2/1992 |
| EP | 273475 | | 3/1992 |
| EP | 648433 | | 10/1994 |
| EP | 1929887 | | 6/2008 |
| EP | WO2008078997 | * | 7/2008 |
| EP | 2207434 | | 8/2011 |
| EP | 2359697 | | 8/2011 |
| EP | 2374361 | | 10/2011 |
| EP | 2481294 | | 8/2012 |
| EP | 2481295 | | 8/2012 |
| FR | 2337534 | | 8/1977 |
| FR | 2343668 | | 10/1997 |
| GB | 1419455 | | 12/1975 |
| GB | 2226220 | | 11/1988 |
| JP | 57-159451 | | 10/1982 |
| JP | 01-168242 | | 7/1989 |
| WO | 85/01188 | | 3/1985 |
| WO | 88/06007 | | 8/1988 |
| WO | 88/06847 | | 9/1988 |
| WO | 89/08549 | | 9/1989 |
| WO | 92/01384 | | 2/1992 |
| WO | 93/03634 | | 3/1993 |
| WO | 93/06752 | | 4/1993 |
| WO | 93/14995 | | 8/1993 |
| WO | 94/13160 | | 6/1994 |
| WO | 94/19917 | | 9/1994 |
| WO | 94/27887 | | 12/1994 |
| WO | 95/07629 | | 3/1995 |
| WO | 95/23523 | | 9/1995 |
| WO | 95/24110 | | 9/1995 |
| WO | 95/30344 | | 11/1995 |
| WO | 96/02149 | | 2/1996 |
| WO | 96/22228 | | 7/1996 |
| WO | 96/32026 | | 10/1996 |
| WO | 96/38054 | | 12/1996 |
| WO | 97/03572 | | 2/1997 |
| WO | 97/29653 | | 8/1997 |
| WO | 98/08399 | | 3/1998 |
| WO | 99/44439 | | 9/1999 |
| WO | 2005/112664 | | 12/2005 |
| WO | 2006/030333 | | 3/2006 |
| WO | 2006/082804 | | 8/2006 |
| WO | 2010/001101 | | 1/2010 |

OTHER PUBLICATIONS

U.S. Appl. No. 13/015,486, "Production of microwaveable coated food products", Keith Graham Pickford, filed Jan. 27, 2011.
U.S. Appl. No. 13/015,491, "Microwaveable coated food product, and method and apparatus for the manufacture thereof", Keith Graham Pickford, filed Jan. 27, 2011.
U.S. Appl. No. 13/107,814, "Microwaveable batter", Keith Graham Pickford, filed May 13, 2011.
U.S. Appl. No. 13/331,900, "Crumb Manufacture," Pickford et al., filed Dec. 20, 2011.
U.S. Appl. No. 12/764,428, Office Action mailed Jan. 5, 2012.
U.S. Appl. No. 12/764,428, Office Action mailed Jun. 21, 2012.
Altschul, A.M., "Low-calorie foods handbook", Georgetown University School of Medicine, Marcel Dekker, Inc., Jul. 29, 1993, pp. 1-10.
Henderson, A., "Cellulose ethers—the role of thermal gelation", Dow Chemical Europe, CH-8810 Horgen, Switzerland, 1988, pp. 265-275.
WO application No. PCT/GB96/01685, International Search Report mailed Oct. 29, 1996.
WO application No. PCT/GB97/00924, International Search Report mailed Jul. 30, 1997.
WO application No. PCT/GB99,00564, International Search Report mailed Jun. 29, 1999.
U.S. Appl. No. 09/000,319, Office Action mailed Feb. 3, 1999.
U.S. Appl. No. 09/000,319, Office Action mailed Mar. 27, 2000.
U.S. Appl. No. 09/381,848, Office Action mailed Sep. 26, 2000.
U.S. Appl. No. 09/381,848, Office Action mailed May 8, 2001.
U.S. Appl. No. 09/646,068, Office Action mailed May 8, 2002.
U.S. Appl. No. 09/646,068, Office Action mailed Feb. 4, 2003.
U.S. Appl. No. 12/669,953, "Crumb coating for food products", Keith Graham Pickford, filed Jan. 20, 2010.
U.S. Appl. No. 12/764,428, "Microwaveable batter", Keith Graham Pickford, filed Apr. 21, 2010.
U.S. Appl. No. 12/764,421, "Coated stabilised microwave heated foods", filed Apr. 21, 2010.
Clextral Press Release: New drying technology provides optimal drying for complex products and reduces energy expense, Clextral—a division of Groupe Legris Industries, Jun. 2009.
Clextral Rotante Evolum dryer—new generation for sustainable development, Clextral—a division of Groupe Legris Industries, Jun. 2009.
U.S. Appl. No. 12/764,421, Office Action mailed Oct. 9, 2012.
U.S. Appl. No. 13/015,486, Office Action mailed Oct. 12, 2012.

(56) References Cited

OTHER PUBLICATIONS

FoodSafety.gov, "Minimum Cooking Temperatures," downloaded from http://www.foodsafety.gov/keep/charts/mintemp.html on Sep. 30, 2012.
Kuntz, Lynn A., "The Great Cover-Up: Batters, Breadings & Coatings," downloaded from http://www.foodproductdesign.com on Sep. 28, 2012.
U.S. Appl. No. 13/015,491, Office Action mailed Oct. 15, 2012.
WO patent application No. PCT/GB2009/001617, Search Report and Written Opinion mailed Jul. 1, 2008.
EP patent application No. 09772781.2, Communication under Rule 71(3) EPC, intent to grant, mailed Mar. 14, 2011.
EP patent application No. 1119483.6, Extended European Search Report mailed Aug. 10, 2012.
U.S. Appl. No. 13/331,900, Office Action mailed Dec. 7, 2012.
Perten, Harald, "Application of the falling number method for evaluating alpha-amylase activity," Cereal Chemistry, vol. 41, May 1964, pp. 127-140.
English translation of Paris GDS Moulins FR 2,458,227, Jan. 1981.
Edwards, W.P., "The Science of Bakery Products," Chapter 7—Raw Materials, The Royal Society of Chemistry, 2007.
English translation of Wiedmann et al., EP 0510320A1, Oct. 1992, downloaded from http://translationportal.epo.org on Jan. 25, 2013.
"Criteria for Judging Quality," published Jun. 20, 2008, downloaded from http://web.archive,org/web/20080620034754http://www.theartisan.net/flour_criteria_judging.htm on Jan. 25, 2013.
English translation of RU 2277438, Rye-wheat bread and its proI3vodstva, Berestnev et al., Jun. 10, 2006.
U.S. Appl. No. 13/015,486, Office Action mailed Feb. 19, 2013.
U.S. Appl. No. 12/764,428, Office Action mailed Mar. 22, 2013.
U.S. Appl. No. 12/764,421, Office Action mailed Apr. 1, 2013.
U.S. Appl. No. 12/764,407, Office Action mailed Apr. 5, 2013.
U.S. Appl. No. 13/331,900, Office Action mailed Apr. 10, 2013.
EP patent application No. 12178463, European Search Report mailed Jan. 22, 2013.
WO patent application No. PCT/EP2012/076015, International Search Report and Written Opinion mailed May 7, 2013.
U.S. Appl. No. 13/015,491, Office Action mailed Jun. 5, 2013.
U.S. Appl. No. 13/107,814, Office Action mailed Jun. 21, 2013.
U.S. Appl. No. 12/669,953, Notice of Allowance mailed Jul. 25, 2013.
EP patent application No. 11163536.3, Communication under Rule 71(3) EPC, Intent to Grant, mailed May 30, 2013.

* cited by examiner

STABILISATION OF MICROWAVE HEATED FOOD SUBSTRATES

BACKGROUND OF THE INVENTION

This invention relates to food products which can be cooked or reheated using a microwave oven. The invention relates particularly but not exclusively to foodstuffs comprising a core and a coating surrounding the core, for example a battered or breaded product. The invention also relates to non-coated food products and to ingredients for food products. This invention also includes products which may be cooked or reheated in a conventional thermal oven grill or shallow or deep fried.

Many food materials, for example natural muscle of poultry, fish or red meat or vegetable or processed foods contain a large percentage of water. Most fresh foods contain more than 60% water. Some of this water is bound, that is tightly attached to the constituent cells. The remaining mobile water is available and can be frozen. If a food product is frozen to a core temperature of between −1° C. and −30° C. or lower and is placed and irradiated in a microwave oven, the microwave energy will be primarily absorbed by the frozen available water. Whereas in conventional cooking heat is applied from the exterior, in microwave cooking heat is generated from within. The process of heating can be very rapid so that available water is converted into steam. When a food product is allowed to stand after heating in a microwave oven, water can continue to be expelled from the product. This is particularly noticeable for example when heating frozen fish muscle. The loss of water causes any food coating, particularly a batter, pastry or breadcrumb coating to become soggy and unpalatable. In addition the core of the substrate may become dry due to the loss of water.

Attempts have been made to limit the escape of moisture during microwave cooking by coating the product with a composition which forms an impermeable film. This is unsatisfactory because the natural distribution of water within the coated product is lost through any coating as steam and due to internal pressure. Furthermore an impenetrable coating or film is detrimental to the taste and mouth feel of the product.

WO97/03572 discloses a method of stabilising a microwave cookable or reheatable food material by impregnation of the product with a stabiliser composition comprising cellulose gum, modified starch, polydextrose, xanthan gum, egg albumen and pea starch.

DETAILED DESCRIPTION OF THE INVENTION

According to a first aspect of the present invention a method of manufacture of a food product comprises the steps of: wholly or partially impregnating a substrate with a stabiliser composition wherein the substrate comprises pieces of meat, poultry, fish vegetable, fruit or dairy foods;

wherein the stabiliser composition comprises by dry weight:

| | |
|---|---|
| cellulose gum | 5-25% |
| modified starch | 16-50% |
| a thickener component | 32-79% | wherein the percentages of the ingredients are selected from the ranges quoted to total 100%; and
optional further ingredients and coating the impregnated substrate with an aqueous coating composition comprising 0.1 to 5% by dry weight of a mixture comprising by dry weight:

| | |
|---|---|
| cellulose gum | 15-35% |
| modified starch | 15-50% |
| hydrocolloid | 20-30% |
| proteinaceous component | 10-20% | wherein the percentages of the ingredients are selected from the ranges quoted to total 100%.

Preferably the stabiliser composition is an aqueous solution. Alternatively a dry powder mixture can be employed, particularly for application to moist or wet substrates.

The amount of modified starch in the stabiliser composition is preferably from about 16% to about 40% especially from about 16% to about 35% by dry weight.

The amount of modified starch in the coating composition is preferably from about 15% to about 40%, especially from about 15% to about 35% by dry weight.

Preferably the thickener component comprises as percentages of the dry stabiliser composition or more of the following ingredients

| | |
|---|---|
| polydextrose | 30-55% |
| proteinaceous component | 1-20% |
| hydrocolloid | 1-10% |

The substrate may be impregnated with the composition to the extent that the ingredients penetrate at least the surface layer of the substrate or preferably impregnate the bulk of the substrate structure. Impregnation may be achieved by soaking, permeation or injection into the substrate.

Polydextrose as employed in this invention is available under the trade mark LITESSE. An amount of about 30% to about 55%, preferably about 35% to about 45% more preferably about 40% may be used.

In a preferred embodiment the stabiliser contains polydextrose and the coating composition does not contain any or a substantial amount of polydextrose.

The proteinaceous component of the stabiliser composition may comprise ingredients selected from the group consisting of: egg albumen, whey protein, protein isolate and mixtures thereof. A suitable protein isolate is soya protein isolate. Use of egg albumen is preferred.

Suitable hydrocolloids may be selected from the group consisting of xanthan gum, carageenan gum, guar gum and mixtures thereof. Use of xanthan gum, guar gum or mixtures thereof is particularly preferred Use of xanthan gum or a mixture of hydrocolloids containing xanthan gum is especially preferred. An amount of about 3% to about 10%, particularly about 6% is preferred.

The cellulose gum and modified starch may be considered to act as a thermal gelation component. The thickener component may serve as a binder. Without wishing to be bound by theory it is believed that the gelation component may serve to form a thermal gel during heating preventing loss of water from the substrate. The thickener component may serve as a thickener and binder and may also serve as a cryoprotectant so that the overall stabiliser composition retains water in the substrate matrix during cooking or reheating in a microwave oven and so that the product has improved storage properties when frozen.

In a preferred embodiment the stabiliser composition comprises an aqueous solution of

| | |
|---|---|
| cellulose gum | 5-25% |
| modified starch | 16-35% |
| polydextrose | 30-55% |
| hydrocolloid | 1-10% |
| egg albumen | 1-20% | wherein the percentages of the ingredients are by dry weight and are selected from the ranges quoted to total 100%.

A particularly preferred stabiliser composition comprises:

| | |
|---|---|
| cellulose gum | 10-20% |
| modified starch | 20-30% |
| polydextrose | 35-45% |
| hydrocolloid | 3-10% |
| egg albumen | 3-18% |

The preferred hydrocolloid is xanthan gum or a mixture of hydrocolloids containing xanthan gum.

An especially preferred stabiliser composition comprises:

| | |
|---|---|
| cellulose gum | 15% |
| modified starch | 24% |
| polydextrose | 40% |
| xanthan gum | 6% |
| egg albumen | 15% |
| Total | 100% |

According to a preferred aspect of the present invention the method includes the further step of coating the impregnated substrate with an aqueous coating comprising a free flowing viscous solution or a gel comprising water and 0.1-5% by dry weight of:

| | |
|---|---|
| cellulose gum | 15-35% |
| modified starch | 15-35% |
| hydrocolloid | 20-30% |
| proteinaceous component | 10-20% | wherein the percentages of the ingredients are by dry weight and are selected from the ranges quoted to total 100%.

The aqueous coating may be a viscous aqueous solution, may be thixotropic, or may be a gel which forms a solid or semi-solid consistency when not subjected to shear. The aqueous coating is preferably a free flowing viscous fluid or gel and may be referred in this specification as a "gel" or "aqueous coating" for convenience.

The preferred hydrocolloid is xanthan gum or a mixture of hydrocolloids containing xanthan gum.

The aqueous coating or gel composition is preferably dissolved or dispersed in water to form a viscous solution with a solids content of about 0.1% to 5%, preferably about 0.3% to 3%, more preferably about 1%.

The aqueous stabiliser is preferably dissolved or dispersed in water to give a solution with a solids content of about 0.1% to about 20%, preferably about 1% to about 8%, more preferably about 3% to about 5%.

Preferred cellulose gums may be selected from the group consisting of: methyl cellulose, hydroxypropyl methyl cellulose and carboxymethyl cellulose. Methyl cellulose orcellulose ethers particularly as sold under the trade mark METHOCEL A4M is especially preferred. An amount of about 10%, preferably about 15% is particularly preferred.

Preferred modified starches comprise partially degraded starch which has been modified for example by heating or acetylation. Hydroxyalkylated starch for example hydroxypropylated starch may be employed. A suitable modified starch is manufactured under the trade mark THERMFLO. An amount of about 20% to about 30%, preferably about 24% is preferred.

Suitable hydrocolloids for use in the aqueous coating composition may be selected from the group consisting of: xanthan gum, carageenan gum, guar gum and mixtures thereof. Use of xanthan gum, guar gum or mixtures thereof is particularly preferred Use of xanthan gum or a mixture of hydrocolloids containing xanthan gum is especially preferred. An amount of about 5%, particularly about 6% is preferred.

The proteinaceous containing component of the aqueous coating may comprise ingredients selected from the group consisting of: egg albumen, whey protein, protein isolate and mixtures thereof. A suitable protein isolate is soya protein isolate. Use of egg albumen is preferred.

Further ingredients may be used as necessary. For example flavourings, preservatives or colourants may be added. An amount of about 1 to about 20% may be employed.

Preferred stabiliser an aqueous coating compositions do not contain substantial amounts of other starches. In particularly preferred embodiments one or both of the stabiliser or aqueous coating compositions consist essentially of the disclosed ingredients, that is no further ingredients are present in sufficient amounts to alter the essential properties of the composition. More preferably there are no further ingredients in the stabiliser and aqueous coating compositions.

According to a second aspect of the present invention a microwave cookable or reheatable food product comprises a substrate wholly or partially impregnated with a stabiliser composition in accordance with the first aspect of this invention, wherein the impregnated substrate is coated with an aqueous coating comprising water and about 0.1-5% by dry weight of:

| | |
|---|---|
| cellulose gum | 15-35% |
| modified starch | 15-35% |
| hydrocolloid | 20-30% |
| proteinaceous component | 10-20% |

The proteinaceous component may comprise ingredients selected from the group consisting of: egg albumen, whey protein, protein isolate and mixtures thereof. A suitable protein isolate is soya protein isolate. Use of egg albumen is preferred.

A particularly preferred aqueous coating composition comprises:

| | |
|---|---|
| cellulose gum | 20-30% |
| modified starch | 20-40% |
| hydrocolloid | 20-40% |
| egg albumen | 10-30% |

An especially preferred aqueous coating composition comprises:

| | |
|---|---|
| cellulose gum | 25% |
| modified starch | 35% |
| xanthan gum | 25% |
| egg albumen | 15% |
| Total | 100% |

In a particularly preferred embodiment of the invention a first coating of fine crumb is applied to the aqueous coating.

Advantageously the fine crumb has a particle size of about 0.1 to about 1 mm, preferably about 0.25 to about 0.9 mm. Smaller particles, for example crumb dust, may be used. A 1 mm mesh sieve may be used to screen larger particles from the fines. The fine crumb may comprise fines resultant from milling during manufacture of crumb used for the exterior coating of a food product.

Untreated fines may be used, for example pin head rusk. However use of pin head rusk may not be preferred for certain applications due to a tendency to form a moist or slimy coating caused by picking up of water from contact with the aqueous coating or gel from a batter composition. Applied to the fine crumb layer.

Preferably crumb fines incorporating a hydrocolloid may be employed. The hydrocolloid may be selected from guar gum, xanthan gum or mixtures thereof. Use of a hydrocolloid may provide a degree of water resistance to the fines reducing any tendency to pick up moisture from adjacent gel or batter layers. Use of fines resulting from the process for manufacture of crumb as disclosed in WO 2010/001101 is especially preferred.

Application of a first coating of crumb fines may be difficult without use of an aqueous coating or gel applied as a pre-coat as disclosed above since the fines will not adhere sufficiently to a dry substrate such as a conventional pre-dust. Use of the aqueous coating or gel coating has the additional advantage that the fines layer may adhere to the substrate providing a complete covering or shell surrounding the stabilised substrate to reduce the escape of water vapour or ingress of fat during frying. Application of the aqueous coating or gel allows formation of a complete coating on the substrate allowing adhesion of the first fine crumb to the entire surface forming an integral shell of the fine crumb.

The first crumb coating may be applied using a first crumb applicator, the crumb being applied in excess with the surplus being shaken off.

A loading of the crumb layer may be about 5-10% of the weight of the stabilised substrate, dependent on the size of the substrate particles and other factors.

Following application of the first crumb, a coating of batter may be applied by immersion using a tempura applicator or other convenient apparatus. Following application of the batter layer a second outer crumb coating may be applied. Preferably two outer coatings of crumb are applied, the first coating being of larger particles followed by a further coating of smaller particles to fill any gaps between the larger particles.

In a preferred embodiment the first outer crumb coating comprises particles having a size of 1-3 mm preferably about 2 mm or larger as appropriate. The crumb may be applied in excess using a crumb applicator with surplus shaken off. The crumb coated substrate may be passed through a roller to improve adhesion.

A second outer coating of smaller particles of crumb for example having a size from about 0.2 to about 2 mm and preferably about 0.5 to about 1 mm may be applied dependent on the size of the substrate and the dimensions of the first outer crumb. Use of two crumb layers forms an integral coating without the batter layer being visible. A roller may be used to improve adhesion of the second crumb coating.

This invention also provides a dry composition for hydration to form a stabiliser or an aqueous coating in accordance with previous aspects of this invention.

A method of stabilisation and stabiliser compositions in accordance with this invention may be used for coated products such as crumbed or pastry enrobed products. In addition the composition may be used for uncoated products including cooked meat, for example sausages and fish. Vegetables and fruit may also be stabilised.

The method may include the step of applying a second or further batter coating to the impregnated coated substrate.

A batter coating may be applied to the substrate. A suitable batter coating is disclosed in our UK patent application No 1000647.6 filed 15 Jan. 2010, the disclosure of which is incorporated into the specification by reference for all purposes. Alternatively a coating as disclosed in WO96/32026 may be used.

A crumb coating may be applied to the batter coating. A preferred crumb coating is disclosed in WO 2010/001101, the disclosure of which is incorporated in to the present specification for all purposes by reference.

The battered and/or crumb coated product may be fried and then frozen for storage prior to use.

The coated product, whether frozen, chilled or fresh, may be reheated or cooked before use using an oven selected from: a microwave oven, a conventional oven or grill, deep or shallow fried, or an oven using a combination of microwave and conventional heating.

The pieces of the substrate may be whole portions, for example whole muscle portions such as individual steaks or fillets or larger pieces which may be cut into individual portions after cooking or reheating. Alternatively the pieces may comprise chopped or comminuted pieces, for example, nuggets or minced products which may be reformulated into larger portions.

The substrate may be impregnated with the stabiliser composition by vacuum impregnation, soaking or injection.

Stabiliser compositions in accordance with this invention can confer several advantages. Application of a pre-dust is avoided, preventing problems arising from dispersion of dust in the manufacturing environment. Furthermore the transmission of dust into a batter composition used in a subsequent coating step is avoided, preventing an increase in viscosity of the batter during use. The aqueous coating or gel coating exhibits good adhesion to the impregnated substrate. Adhesion of subsequently applied crumb or other fine particles is facilitated. The gel coating also serves as an additional barrier to loss of moisture from the substrate during the subsequent microwave heating stage. Without wishing to be bound by theory it is believed that the gel coating composition adsorbs moisture escaping from the core and also serves as a barrier to fat pickup by the core, avoiding impairment of the flavour of the core. Impregnation of the core with an aqueous solution of the stabiliser contributes to the moisture content of the core during cooking or reheating.

Amounts and percentages referred to in this specification are by weight unless indicated otherwise and are selected from any ranges quoted to total 100%.

The invention is further described by means of example but not in any limitative sense.

Example 1

Stabiliser Composition

A stabiliser composition was prepared using the following ingredients:

| Ingredient | % |
|---|---|
| cellulose gum (Methocel A4M) | 15.0 |
| modified starch (Thermflo) | 24.0 |
| polydextrose | 40.0 |
| xanthan gum | 6.0 |
| egg albumen | 15.0 |
| Total | 100.0 |

Example 2

General-Purpose Stabiliser Composition

A composition of the following ingredients was used:

| | |
|---|---|
| Methylcellulose | 15% |
| modified starch (Thermflo) | 24% |
| egg albumen | 15% |
| xanthan gum | 6% |
| polydextrose | 40% |
| | 100% |

The composition was dissolved in water to produce a solution with a concentration suitable to stabilise the particular substrate in use. This general purpose formula may be modified to increase its efficiency in specific substrates. The above formula may be modified by addition of citric acid (up to 1%) and ascorbic acid (up to 2%) with the polydextrose (Litesse II (Trade Mark)) being reduced accordingly.

Example 3

Preparation of Stabiliser Composition

The dry powder mixture was partially hydrated in a tub and then poured into a bowl chopper. The bowl chopper was then run for two to three minutes until fully hydrated. The mixture can be hydrated directly in the bowl chopper if required. Alternatively, the stabiliser may be hydrated using a high shear mixer fitted with a general purpose head.

Example 4

Impregnation of Substrate with Stabiliser Composition

A chicken mixture for chicken dippers or nuggets was prepared with the following composition which was prepared as a dry mixture, as an alternative to use of a hydrated stabiliser composition. The stabiliser of Example 1 was used.

| | |
|---|---|
| chicken emulsion | 20% |
| skin - 3 mm | 18% |
| chicken breast - 10 mm | 50% |
| water | 2% |
| rusk | 2% |
| stabiliser(Example 1) | 5% |
| seasoning | 3% |
| | 100% |

The chicken breast was chilled to −3° C. and minced using a 10 mm plate. After mincing, the temperature was 0-3° C. Water was added with mixing. A chicken emulsion comprising the following ingredients was added with mixing:

| | |
|---|---|
| chicken skin | 44% |
| water | 44% |
| soya isolate | 11% |
| salt | 1% |
| | 100% |

The stabiliser in accordance to Example 1 was added and mixed thoroughly. Rusk was added with mixing following by seasoning. A dry powder flavouring was preferred. The composition was allowed to dissolve in use in water which was present in the substrate in order to form an aqueous stabiliser solution in situ.

A vacuum was applied to the mixture to consolidate the structure following which the chicken mixture was chilled to −3° C. and formed into shaped pieces.

A similar procedure was used for other comminuted meat products. Large particulate cores may be manufactured using a similar method.

Example 5

Impregnation of Chicken Mixture with Stabiliser Composition

| | |
|---|---|
| chicken breast meat (13 mm) | 79% |
| salt | 1% |
| water | 12% |
| stabiliser (Example 1) | 5% |
| inulin and seasoning | 3% |
| | 100% |

Example 6

Impregnation of Fish Mixture with Stabiliser Composition

| | |
|---|---|
| cod fillet blocks (partially thawed) | 85.8% |
| salt | 0.9% |
| water | 4.6% |
| stabiliser (Example 1) | 4.8% |
| fish binder | 3.9% |
| | 100% |

Example 7

Batter Coating Composition

A batter coating composition was prepared by mixing the following ingredients:

| Ingredient | % |
|---|---|
| soya flour (Hisoy) | 29.0 |
| high amylase starch (Hylon 7) | 28.8 |
| maize flour | 19.2 |
| whole egg (Henningsen W1) | 14.0 |
| glyceryl monostearate | 2.0 |
| D-xylose | 02.0 |
| monosodium phosphate | 1.90 |
| guar gum | 1.0 |
| ammonium bicarbonate | 0.7 |
| glucono-D-lactone | 0.7 |
| sodium acid pyrophosphate | 0.4 |
| thickener (Methocel A4M) | 0.2 |
| alpha-amylase | 0.1 |
| | 100.0 |

The batter can be mixed in batches using a Silverson DX high shear mixer on a gantry with a slotted disintegrating head. Batches were mixed in the ratio of 25 kilos water to 12.5 kilos dry batter powder in a vat with a diameter of 68 cm. Thereafter, the mix was diluted as required for example to give a ratio of water:powder of 2.4:1.

In full scale production the batter ingredients were mixed in a ratio of water:powder of 2.4:1 using two 200 liter stainless steel vessels linked by a pump and an inline Silverson mixer with a high shear slotted disintegrating head. One tank was fitted with a paddle and was filled with water at 15-20° C. The dry ingredients were added to the water and wetted by rotation of the paddle. The second tank was fitted with a cooling jacket and a return pipe to the first vessel. The batter mixture was circulated through the high shear head until a temperature of 42° C. was reached by mechanical heat transfer. External heating may be employed to avoid a tendency to over shear the starch. When 42° C. was reached, the mixing and enzymolyis were complete. The batter was transferred to the second vessel and cooled. A heat exchanger may be used to cool the mixture. After cooling, the batter was pumped into a tempura type batter applicator.

The viscosity in the batter mixture was in the range 550-650 cP as measured by a number 3 spindle at 60 rpm. The batter was found to give a good rate of pickup and a crisp coating after frying.

Example 8

Aqueous Coating Composition

The following mixture was prepared:

| | |
|---|---|
| modified starch (Thermflo) | 35% |
| thickener (Methocel A4M) | 25% |
| xanthan gum | 25% |
| egg albumen | 15% |
| | 100% |

The mixture was dissolved in water to form a 1% solution using a CFS Scanbrine mixer with paddle agitation. The solution was left to stand for 24 hours to form a fully hydrated gel or viscous solution.

The aqueous coating was applied to impregnated substrates of Examples 4 to 6 using a tempura type batter applicator in which the substrate particles were dipped.

A pump is necessary to run the machine but after a short while bubbles form in the gel solution in the applicator. To prevent this problem food grade anti foaming agents can be used. Polydimethylsiloxane is preferred but calcium alginate, methyl ethyl cellulose, methylphenylpolysiloxane or polyethylene glycol can be used.

Example 9

Crumb Application

A crumb was prepared as disclosed in WO 2010/001101, the disclosure of which is incorporated herein by reference for all purposes.

Following application of the aqueous coating as described in Example 8, a fine crumb was applied with a mesh size less than 1 mm such as may be described as a dust, using a CFS Crumbmaster breadcrumb applicator.

The fine crumb coated impregnated substrate was passed through the batter of Example 7 in a tempura batter applicator.

A 2 mm crumb was applied in a second CFS Crumbmaster breadcrumb applicator with slight pressure from a roller. Particles were passed through a third CFS Crumbmaster breadcrumb applicator to infill with a 1 mm crumb using light pressure from a roller.

Example 10

Frying and Cooking

The coated substrate of Example 9 was fried in pure, fresh rapeseed oil for 2 minutes 20 seconds approximately at 180-188° C. The frying time can be varied depending upon the weight and size of the particles. After frying, the core temperature was 74-85° C. A small loss of weight was observed due to loss of water from the substrate but this is mostly compensated for by the uptake of oil.

The invention claimed is:

1. A method of manufacture of a food product comprising the steps of:
    impregnating a substrate with a stabilizer composition
        wherein the substrate comprises pieces of meat, poultry, fish, vegetable, fruit or dairy foods;
    wherein the stabilizer composition consisting essentially of by dry weight:

| | |
|---|---|
| cellulose gum | 5-25% |
| modified starch | 16-50% |
| thickener component | 32-79%, | wherein the thickener component comprises as percentages by dry weight of the stabilizer composition:

| | |
|---|---|
| polydextrose | 30-55% |

| | |
|---|---|
| proteinaceous component | 1-20% |

| | |
|---|---|
| hydrocolloid | 1-10% | wherein the percentages of the ingredients are selected from the ranges quoted to total 100%; and coating the impregnated substrate with an aqueous coating composition comprising 0.1 to 5% of a mixture consisting of by dry weight:

| | |
|---|---|
| cellulose gum | 15-35% |
| modified starch | 15-50% |
| hydrocolloid | 20-30%, | wherein the hydrocolloid is selected from the group consisting of xanthan gum, carrageenan gum, guar gum and mixtures thereof
egg albumin 10-20%
wherein the percentages of the ingredients are selected from the ranges quoted to total 100%;
and
wherein the coating composition does not contain any substantial amount of polydextrose.

2. A method as claimed in claim 1, wherein the stabilizer composition is an aqueous solution.

3. A method as claimed in claim 1, wherein the amount of modified starch in the stabilizer composition is 16 to 35% by dry weight.

4. A method as claimed in claim 1, wherein the amount of modified starch in the coating composition is 15 to 35% by dry weight.

5. A method of manufacture of a food product as claimed in claim 1, wherein the proteinaceous component of the stabilizer is selected from the group consisting of egg albumin, whey protein, protein isolate and mixtures thereof.

6. A method of manufacture of a food product as claimed in claim 5, wherein the proteinaceous component is egg albumin.

7. A method of manufacture of a food product as claimed in claim 6, wherein the stabilizer composition comprises as percentages of dry weight of the stabilizer composition:

| | |
|---|---|
| cellulose gum | 5-25% |
| modified starch | 16-35% |
| polydextrose | 30-55% |
| hydrocolloid | 1-10% |
| egg albumin | 1-20%. |

8. A method of manufacture of a food product as claimed in claim 7, wherein the stabilizer composition comprises:

| | |
|---|---|
| cellulose gum | 10-20% |
| modified starch | 20-30% |
| polydextrose | 35-45% |
| hydrocolloid | 3-10% |
| egg albumin | 3-18%. |

9. A method of manufacture of a food product as claimed in claim 8, wherein the stabilizer composition comprises:

| | |
|---|---|
| cellulose gum | 15% |
| modified starch | 24% |
| polydextrose | 40% |
| xanthan gum | 6% |
| egg albumin | 15% |
| Total | 100% . |

10. A method of manufacture of a food product as claimed in claim 1, wherein the hydrocolloid of the aqueous coating composition is selected from the group consisting of: xanthan gum, guar gum and mixtures thereof.

11. A method of manufacture of a food product as claimed in claim 10, wherein the hydrocolloid of the aqueous coating composition comprises xanthan gum or a mixture of hydrocolloids including xanthan gum.

12. A method as claimed in claim 1, wherein the aqueous coating composition has a solids content of about 0.3 to about 3%.

13. A method as claimed in claim 1, wherein the stabilizer composition is an aqueous stabilizer composition having a solids content of about 0.1 to about 20%.

14. A method as claimed in claim 1, further comprising:
applying to the aqueous coating a coating of fine crumb to form a layer of fine crumb encasing the coated and impregnated substrate; and
applying to the layer of fine crumb encasing the coated and impregnated substrate a batter composition to form a batter coating.

15. A microwave cookable or reheatable food product obtained by a method according to claim 1.

16. A microwave or thermally cookable or reheatable food product as claimed in claim 15, wherein the food product further comprises:
a coating of fine crumb applied to the coating of the coating composition to form a layer of fine crumb encasing the coated and impregnated substrate;
a batter composition applied to the layer of fine crumb encasing the coated and impregnated substrate to form a batter coating; and
an optional layer of outer crumb applied to the batter coating.

17. A microwave or thermally cookable or reheatable food product as claimed in claim 16, wherein the fine crumb incorporates a hydrocolloid comprising xanthan gum or a mixture of hydrocolloids including xanthan gum.

18. A microwave or thermally cookable or reheatable food product as claimed in claim 15, wherein the fine crumb has a particle size of about 0.25 to about 1 mm.

* * * * *